No. 828,245. PATENTED AUG. 7, 1906.
H. REIMERS.
MECHANICAL MOISTURE WIPER FOR SHOW WINDOWS.
APPLICATION FILED FEB. 1, 1906.
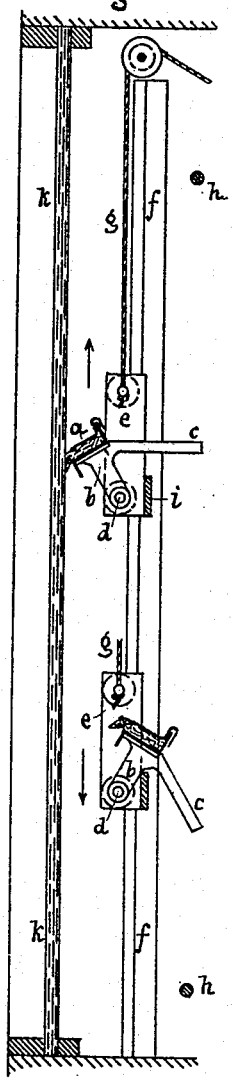
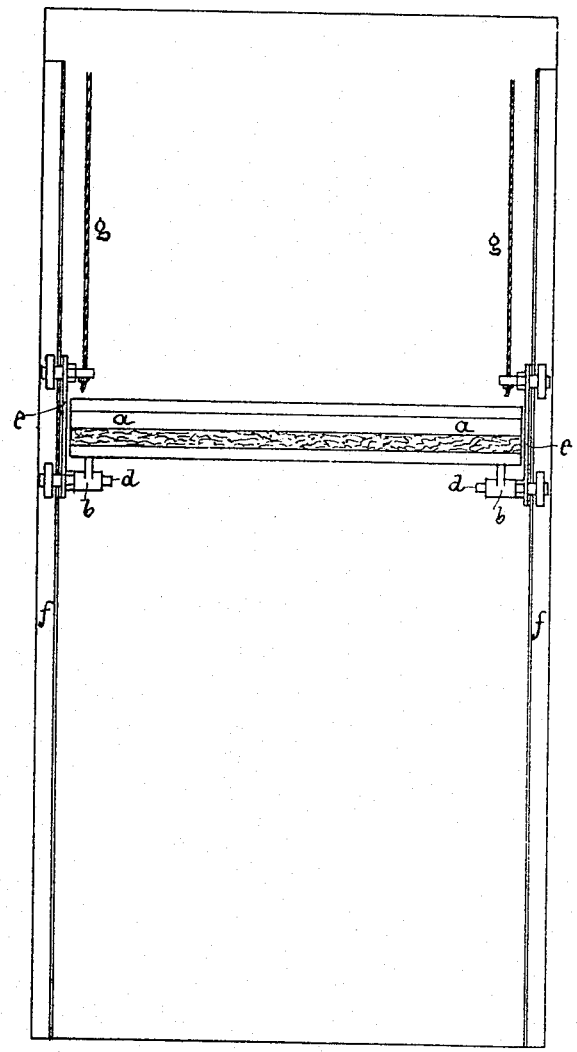
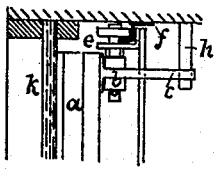

UNITED STATES PATENT OFFICE.

HANS REIMERS, OF ECKERNFÖRDE, GERMANY.

MECHANICAL MOISTURE-WIPER FOR SHOW-WINDOWS.

No. 828,245.    Specification of Letters Patent.    Patented Aug. 7, 1906.

Application filed February 1, 1906. Serial No. 299,062.

*To all whom it may concern:*

Be it known that I, HANS REIMERS, a subject of the German Emperor, residing at Eckernförde, Germany, have invented certain new and useful Improvements in Mechanical Moisture-Wipers for Show-Windows, of which the following is a full, clear, and exact specification.

This invention relates to mechanical moisture-wipers for show-windows, fastened to the window-frame and being moved up and down by pulling a string or chain to clean the window-pane on its whole width from moisture in a short time.

The invention is illustrated in the accompanying drawings, in which—

Figure 1 is a perpendicular section; Fig. 2, a front view, and Fig. 3 a horizontal section.

A strip of felt or other suitable material nearly extending over the whole width of the window is clamped into a frame or plate $a$. This frame is fastened to levers $b$, pivoted to carriages $e$. Arms $c$ project from the clamp rearwardly and serve to tilt the clamp around the pivot-pins $d$. These pins are fastened in the carriages $e$, which are guided on perpendicular guide-bars $f$ of a suitable shape. The carriages $e$ are connected with strings or chains $g$, which lead over rolls in the well-known manner, so that the clamp can be moved like Venetian blinds or shades. Near the upper and the lower ends of the guide-bars stop-pins $h$ are secured in the path of the arms $c$. In Fig. 1 the wiper is shown in two positions, the upper showing the wiper in engagement with the pane $k$ and the lower tilted off for the purpose of getting dry and of being lowered again.

If the wiper is pulled up into the upper position, the felt engages the pane and will take off the moisture. If the wiper reaches the upper end of the guide-bars, it is tilted backward by the arms $c$ striking against the upper stop $h$. The tilting over of the clamp into the inoperative position is limited by a long strip $i$, forming a cross-connection between the carriages. During its downward motion the wiper does not touch the pane. It can dry until the arms $c$ strike the lower stops $h$. By this action the wiper is tilted forward into engagement with the pane, and during the next upward travel it will clean the glass as described.

Having thus described my invention, what I claim is—

In a moisture-wiper for window-panes in combination a clamp for clamping a strip of felt extending over the whole width of the pane, suitably-guided carriages, to support said clamp which is pivotally connected thereto, guides secured to the window-stiles, rollers on the carriages adapted to run on said guides, means for moving the carriages with the clamp up and down along the window-pane, arms $c$ projecting rearwardly from the clamp, stops $h$ in the path of said arms, one at the top and one below, adapted to tilt the felt clamp away from the pane when it reaches the upper position and to throw it back against the pane at the bottom position, substantially as described.

In testimony whereof I affix my signature.

HANS REIMERS.

In presence of—
JULIUS RÖPKE,
HANS BITTINGER.